(12) United States Patent
Florian et al.

(10) Patent No.: US 11,641,316 B2
(45) Date of Patent: May 2, 2023

(54) CAPTURING DATA PACKETS FOR ANALYSIS USING A VIRTUAL MACHINE

(71) Applicant: LENOVO ENTERPRISE SOLUTIONS (SINGAPORE) PTE. LTD., Singapore (SG)

(72) Inventors: Gavril Ioan Florian, Chitila (RO); Andrei I. Bunghez, Ploiesti (RO); Bogdan-Alexandru Ratiu, Segovia (ES); Anda-Maria Nicolae, Bucharest (RO)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 16/915,143

(22) Filed: Jun. 29, 2020

(65) Prior Publication Data
US 2021/0409299 A1 Dec. 30, 2021

(51) Int. Cl.
*G06F 15/173* (2006.01)
*H04L 43/0817* (2022.01)
*H04L 43/0811* (2022.01)
*H04L 12/46* (2006.01)
*H04L 69/22* (2022.01)
*G06F 9/455* (2018.01)
*H04L 9/40* (2022.01)

(52) U.S. Cl.
CPC ...... *H04L 43/0817* (2013.01); *G06F 9/45558* (2013.01); *H04L 12/4633* (2013.01); *H04L 43/0811* (2013.01); *H04L 63/0236* (2013.01); *H04L 69/22* (2013.01); *G06F 2009/45591* (2013.01); *G06F 2009/45595* (2013.01)

(58) Field of Classification Search
None
See application file for complete search history.

(56) References Cited

U.S. PATENT DOCUMENTS 7,953,865 B1 * 5/2011 Miller .................... H04L 29/06
709/227
8,990,799 B1 * 3/2015 Forecast ............. G06F 9/45558
718/1

(Continued)

OTHER PUBLICATIONS

Cisco, "Configuring Virtual Loopback and Null Interfaces on Cisco IOS XR Software", HC-241Cisco IOS XR Interface and Hardware Component Configuration Guide for the Cisco CRS Router OL-26055-03, Cisco (online), accessed Dec. 17, 2019, 10 pages, https://www.cisco.com/c/en/us/td/docs/routers/crs/software/crs_r4-2/interfaces/configuration/guide/hc42crsbook/hc42loop.pdf.

(Continued)

*Primary Examiner* — Brian Whipple
*Assistant Examiner* — Gregory P Tolchinsky (57) ABSTRACT

Capturing data packets for analysis using a virtual machine including receiving, at an analyzer virtual machine, an encapsulated packet for analysis, wherein the encapsulated packet comprises a monitoring metadata header and a data packet with a data packet header; stripping the monitoring metadata header from the encapsulated packet to obtain a de-encapsulated packet comprising the data packet with the data packet header; and directing, based on the data packet header, the de-encapsulated packet to a virtual network interface associated with a packet capture application within the analyzer virtual machine.

20 Claims, 4 Drawing Sheets

(56) References Cited

U.S. PATENT DOCUMENTS

| | | | | |
|---|---|---|---|---|
| 2012/0275328 | A1* | 11/2012 | Iwata | H04L 69/22 370/252 |
| 2016/0314012 | A1* | 10/2016 | Rong | H04L 47/12 |
| 2017/0054659 | A1* | 2/2017 | Ergin | H04L 45/586 |
| 2017/0078198 | A1* | 3/2017 | Nellikar | H04L 41/12 |
| 2017/0099197 | A1* | 4/2017 | Raney | H04L 43/028 |
| 2019/0056972 | A1* | 2/2019 | Zhou | G06F 11/30 |
| 2019/0109769 | A1* | 4/2019 | Jain | H04L 67/2814 |
| 2020/0336511 | A1* | 10/2020 | Martinez De La Cruz | H04L 63/166 |
| 2020/0374219 | A1* | 11/2020 | Saha | H04L 61/2038 |

OTHER PUBLICATIONS

Gadgil, "Linux Virtual Interfaces", Abhijit's Blog (online), Feb. 23, 2018, 7 pages, https://gabhijit.github.io/linux-virtual-interfaces.html.

Juniper, "Applying a Filter to an Interface", Tech Library, Juniper Networks (online), Jul. 7, 2019, 8 pages, https://www.juniper.net/documentation/en_US/junos/topics/task/configuration/interfaces-applying-a-filter-to-an-interface.html.

* cited by examiner

FIG. 4 ns Monitoring traffic on these communications networks, including virtual networks, may be performed to detect and diagnose communications problems between network endpoints. Monitoring such traffic often includes capturing data packets within the monitored traffic by mirroring the data packets and transmitting the data packets to a packet capture application.

CAPTURING DATA PACKETS FOR ANALYSIS USING A VIRTUAL MACHINE

BACKGROUND

Field of the Invention

The field of the invention is data processing, or, more specifically, methods, apparatus, and products for capturing data packets for analysis using a virtual machine.

Description of Related Art

Troubleshooting problems on a communications network may require monitoring one or more data flows of traffic along the network. Monitoring traffic on these communications networks, including virtual networks, may be performed to detect and diagnose communications problems between network endpoints. Monitoring such traffic often includes capturing data packets within the monitored traffic by mirroring the data packets and transmitting the data packets to a packet capture application.

SUMMARY

Methods, systems, and apparatus for capturing data packets for analysis using a virtual machine. Capturing data packets for analysis using a virtual machine includes receiving, at an analyzer virtual machine, an encapsulated packet for analysis, wherein the encapsulated packet comprises a monitoring metadata header and a data packet with a data packet header; stripping the monitoring metadata header from the encapsulated packet to obtain a de-encapsulated packet comprising the data packet with the data packet header; and directing, based on the data packet header, the de-encapsulated packet to a virtual network interface associated with a packet capture application within the analyzer virtual machine.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
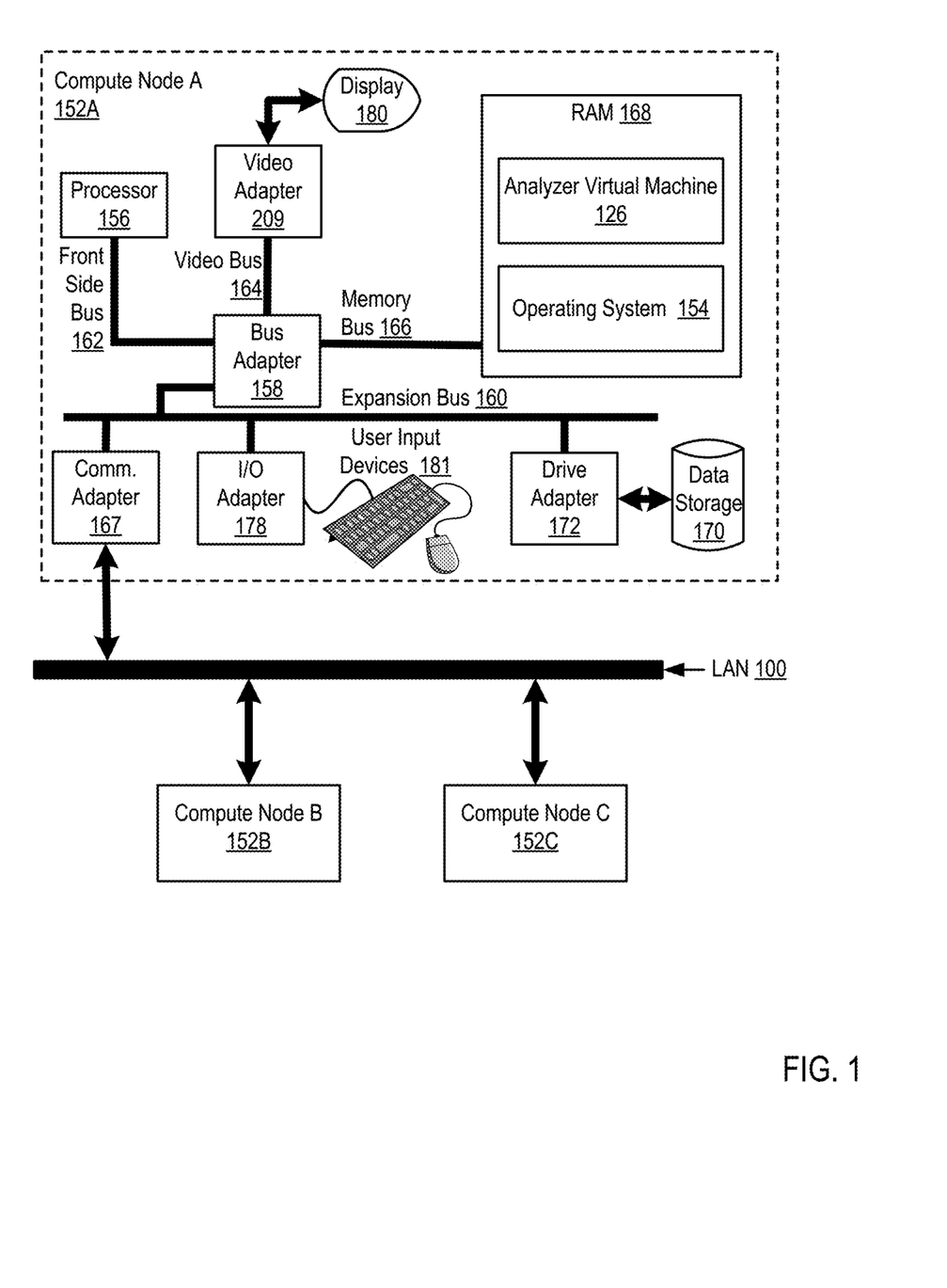
FIG. 1 sets forth a block diagram of an example system configured for capturing data packets for analysis using a virtual machine according to embodiments of the present invention.

Exemplary methods, apparatus, and products for capturing data packets for analysis using a virtual machine in accordance with the present invention are described with reference to the accompanying drawings, beginning with FIG. 1. FIG. 1 sets forth a block diagram of automated computing machinery comprising an exemplary compute node A (152A) configured for capturing data packets for analysis using a virtual machine according to embodiments of the present invention. The compute node A (152A) of FIG. 1 includes at least one computer processor (156) or 'CPU' as well as random access memory (168) ('RAM') which is connected through a high speed memory bus (166) and bus adapter (158) to processor (156) and to other components of the compute node A (152A).

Stored in RAM (168) is an operating system (154). Operating systems useful in computers configured for capturing data packets for analysis using a virtual machine according to embodiments of the present invention include UNIX™, Linux™, Microsoft Windows™, AIX™, IBM's i OS™, and others as will occur to those of skill in the art. The operating system (154) in the example of FIG. 1 is shown in RAM (168), but many components of such software typically are stored in non-volatile memory also, such as, for example, on data storage (170), such as a disk drive. Also stored in RAM is the analyzer virtual machine (126), a module for capturing data packets for analysis using a virtual machine according to embodiments of the present invention.

The compute node A (152A) of FIG. 1 includes disk drive adapter (172) coupled through expansion bus (160) and bus adapter (158) to processor (156) and other components of the compute node A (152A). Disk drive adapter (172) connects non-volatile data storage to the compute node A (152A) in the form of data storage (170). Disk drive adapters useful in computers configured for capturing data packets for analysis using a virtual machine according to embodiments of the present invention include Integrated Drive Electronics ('IDE') adapters, Small Computer System Interface (SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example compute node A (152A) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example compute node A (152A) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary compute node A (152A) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for capturing data packets for analysis using a virtual machine according to embodiments of the present invention include modems for wired dial-up communications, Ethernet (IEEE 802.3) adapters for wired data communications, and 802.11 adapters for wireless data communications.

The communications adapter (167) is communicatively coupled to a local area network (LAN) (100). Other compute nodes (compute node B (152B), compute node C (152C)) are also communicatively coupled to the LAN (100). The analyzer virtual machine (126) operates to monitor traffic sent to or from endpoints (e.g., virtual machines executing within compute node A (152A), compute node B (152B), or compute node C (152C)) on a network (e.g., LAN (100)). One or more systems (such as a network virtualization layer) are configured to mirror all traffic or a subset of traffic on the network. The mirrored data packets are encapsulated with monitoring metadata which directs the encapsulated packets to the analyzer virtual machine (126).

Figure 2:
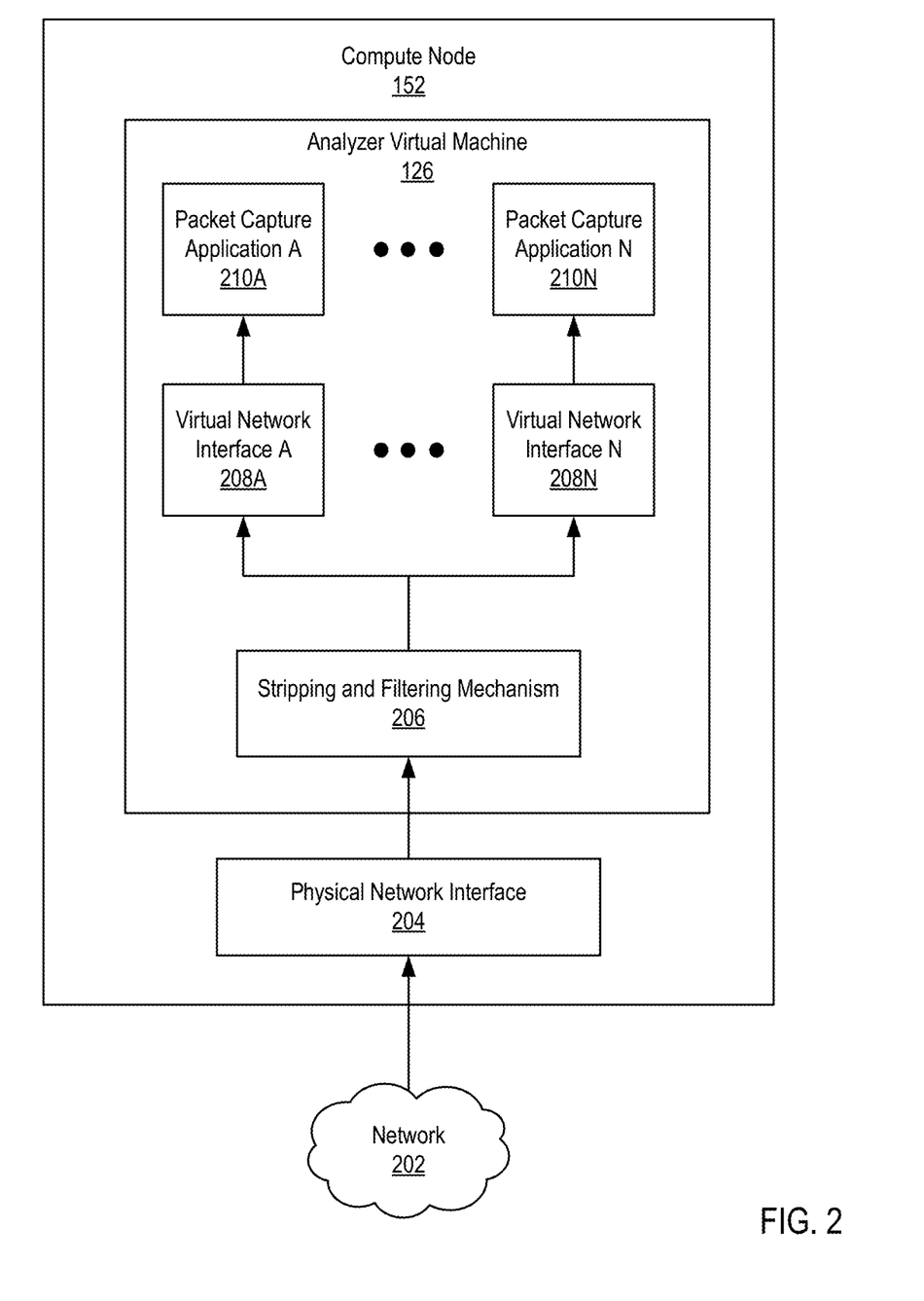
FIG. 2 sets forth a block diagram of an example system configured for capturing data packets for analysis using a virtual machine according to embodiments of the present invention.

FIG. 2 shows an exemplary system for capturing data packets for analysis using a virtual machine according to embodiments of the present invention. As shown in FIG. 2, the exemplary system includes a compute node (152) communicatively coupled to a network (202). The compute node (152) includes a physical network interface (204) and an analyzer virtual machine (126). The analyzer virtual machine (126) includes a stripping and filtering mechanism (206), multiple virtual network interfaces (virtual network interface A (208A), virtual network interface N (208N)) and multiple packet capture applications (packet capture application A (210A), packet capture application N (210N)). The compute node (152) may include other elements not shown (e.g., an operating system, a hypervisor, etc.).

The network (202) is a communications medium from which the analyzer virtual machine receives encapsulated packets. The network (202) may be a physical network or virtual network. The physical network interface (204) is a network interface that couples the analyzer virtual machine (126) to the network (202). The physical network interface (204) may include software elements that virtualize access to the network interface. For example, the physical network interface (204) may be a virtual network function which allows the analyzer virtual machine (126) to interact with the physical network interface (204) as though the analyzer virtual machine (126) has exclusive access to the network interface.

The physical network interface (204) receives encapsulated packets. An encapsulated packet is a data packet that has augmented to include a monitoring metadata header. A data packet includes a data packet header and data packet payload. For encapsulation, the data packet is made the payload of an encapsulated packet that includes a monitoring metadata header. The monitoring metadata header includes information that directs the encapsulated packet to the analyzer virtual machine (126). For example, the address of the analyzer virtual machine (126) may be the target endpoint for the encapsulated packet. Similarly, the monitoring metadata header may be used by the compute node (152) to direct the encapsulated packet to the analyzer virtual machine. Specifically, the physical network interface (204) may read the monitoring metadata header and, based on the content of the monitoring metadata header, direct the encapsulated packet to a location accessible by the analyzer virtual machine (126).

The analyzer virtual machine (126) is a virtual machine configured to monitor and analyze data packets within the encapsulated packets received from the network (202). The analyzer virtual machine (126) may be allotted a subset of compute node (152) system resources. The analyzer virtual machine (126) may be one of a plurality of virtual machines executing within the compute node (152), including virtual machines hosting a source or destination endpoint for monitored data packets. The analyzer virtual machine (126) may include one or more virtual network interfaces (virtual network interface A (208A), virtual network interface N (208N)) and one or more packet capture applications (packet capture application A (210A), packet capture application N (210N))

The stripping and filtering mechanism (206) is an aggregation of hardware and software configured to remove (i.e., strip) the monitoring metadata header from an encapsulated packet to generate a de-encapsulated packet. Incoming encapsulated packets are directed to the stripping and filtering mechanism (206) for processing before the resulting de-encapsulated packets are directed to one of the virtual network interfaces (virtual network interface A (208A), virtual network interface N (208N)) or discarded. The stripping and filtering mechanism (206) may be part of or operating in conjunction with a virtual network function of the physical network interface (204).

The de-encapsulated packet excludes the monitoring metadata header. Specifically, a de-encapsulated packet is a data packet that has first been encapsulated with the monitoring metadata header, and second, been de-encapsulated to remove the monitoring metadata header. A de-encapsulated packet is similar or identical to the data packet prior to encapsulation.

The stripping and filtering mechanism (206) is also configured to send de-encapsulated packets that match a set of criteria to a virtual network interface (virtual network interface A (208A), virtual network interface N (208N)) associated with the filter criteria. The stripping and filtering mechanism (206) includes a set of filters that identify de-encapsulated packets that match the set of criteria. The set of criteria for each filter may be programmed and customized for a characteristic or set of characteristics of the incoming de-encapsulated packets. The criteria may be based on, for example, data packet source address (e.g., media access control address, internet protocol address, etc.), data packet destination address (e.g., media access control address, internet protocol address, etc.), data packet source port, data packet destination port, and/or data packet protocol (e.g., application, transport, internet, or link layer protocols).

Each virtual network interface (virtual network interface A (208A), virtual network interface N (208N)) is an aggregation of hardware and software capable of sending and receiving data generally in the form of data packets. Each virtual network interface (virtual network interface A (208A), virtual network interface N (208N)) receives de-encapsulated packets that match one set of criteria. De-encapsulated packets that do not match any of the sets of criteria are discarded. Encapsulated packets are de-encapsulated before reaching a virtual network interface.

Each virtual network interface (virtual network interface A (208A), virtual network interface N (208N)) receives de-encapsulated packets for one of the packet capture applications (packet capture application A (210A), packet capture application N (210N)). Each packet capture application (packet capture application A (210A), packet capture applications (packet capture application N (210N)) interacts with a virtual network interface (virtual network interface A (208A), virtual network interface N (208N)) as a virtual device configured to operate as a network interface controller for the client partition. Further, each virtual network interface (virtual network interface A (208A), virtual network interface N (208N)) may be allocated a subset of the computing resources assigned to the analyzer virtual machine (126). Such allocation may grant each virtual network interface (virtual network interface A (208A), virtual network interface N (208N)) separate and exclusive access to an allocated subset of resources. Processing the incoming de-encapsulated packets from the stripping and filtering mechanism (206) may therefore not use more resources than are allocated to the virtual network interface. Further, the resources allocated to each virtual network interface (virtual network interface A (208A), virtual network interface N (208N)) may be separate and distinct from resources allocated to other elements within the analyzer virtual machine (126), such as the stripping and filtering mechanism (206).

The packet capture applications (packet capture application A (210A), packet capture application N (210N)) are aggregations of hardware and software capable of monitoring de-encapsulated packets that match one set of criteria from a filter in the stripping and filtering mechanism (206). The packet capture applications (packet capture application A (210A), packet capture application N (210N)) may operate within the application layer of the analyzer virtual machine (126), while the virtual network interfaces (virtual network interface A (208A), virtual network interface N (208N)) may operate within the operating system or kernel layer.

Each virtual network interface and packet capture application pair works together to receive and monitor a group of packets that match one set of criteria. The virtual network interface (virtual network interface A (208A), virtual network interface N (208N)) may remove the data packet header from the data packet and provide the data packet payload to the paired packet capture application (packet capture application A (210A), packet capture applications (packet capture application N (210N)). Alternatively, the data packet header (with or without the data packet payload) is provided to the packet capture application (packet capture application A (210A), packet capture applications (packet capture application N (210N)) for analysis.

Figure 3:
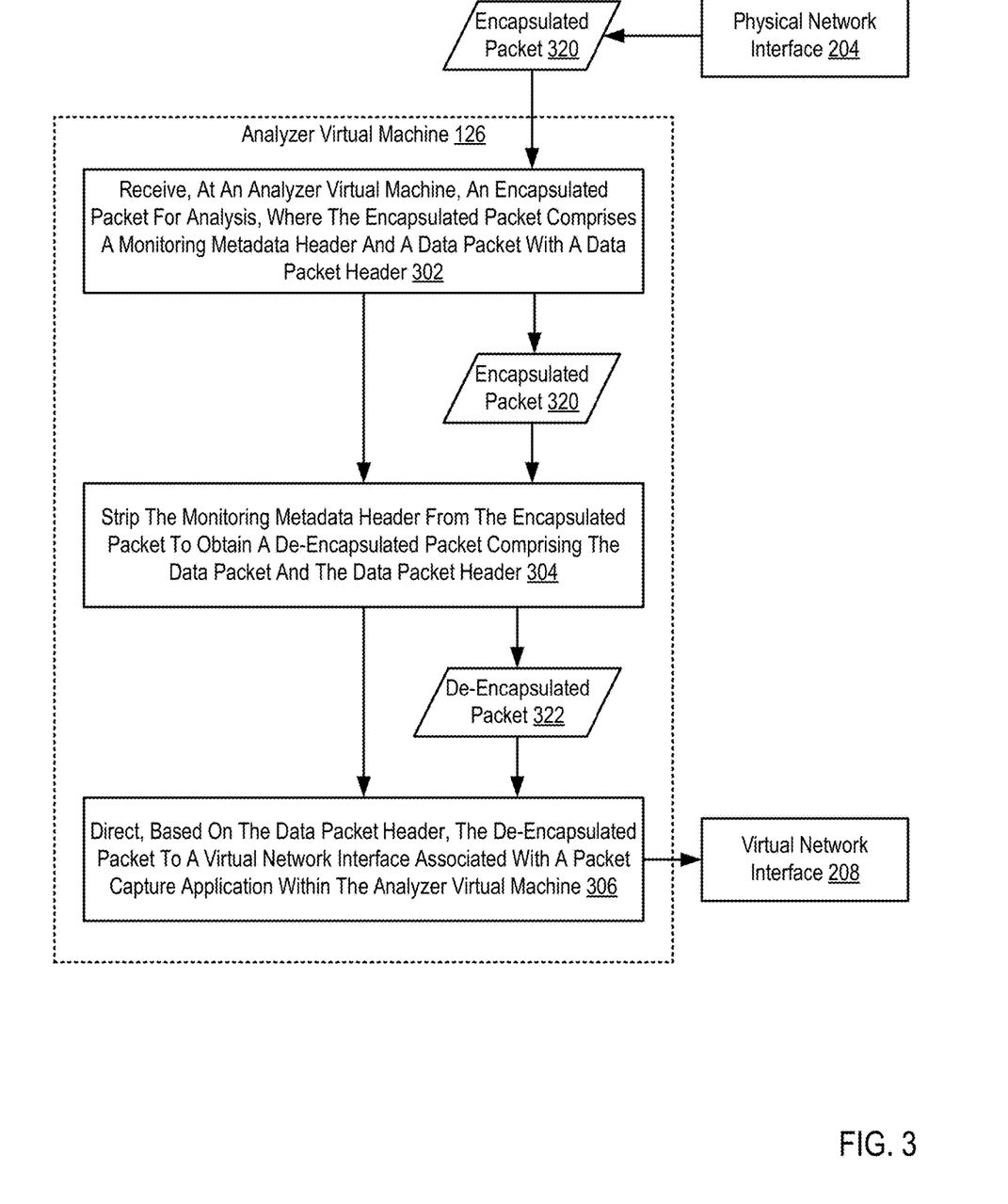
FIG. 3 sets forth a flow chart illustrating an exemplary method for capturing data packets for analysis using a virtual machine according to embodiments of the present invention.

For further explanation, FIG. 3 sets forth a flow chart illustrating an exemplary method for capturing data packets for analysis using a virtual machine according to embodiments of the present invention that includes receiving (302), by an analyzer virtual machine (126), an encapsulated packet (320) for analysis, wherein the encapsulated packet (320) comprises a monitoring metadata header and a data packet with a data packet header. Receiving (302), by an analyzer virtual machine (126), an encapsulated packet (320) for analysis, wherein the encapsulated packet (320) comprises a monitoring metadata header and a data packet with a data packet header may be carried out by the analyzer virtual machine (126) being notified, by the physical network interface (204), of an encapsulated packet ready for processing by the stripping and filtering mechanism. As part of the initial reception of the encapsulated packet by the analyzer virtual machine (126), the packet is sent for processing to the stripping and filtering mechanism before the resulting de-encapsulated packet is sent to a virtual network interface (208).

The method of FIG. 3 further includes stripping (304), by the analyzer virtual machine (126), the monitoring metadata header from the encapsulated packet (320) to obtain a de-encapsulated packet (322) comprising the data packet with the data packet header. Stripping (304), by the analyzer virtual machine (126), the monitoring metadata header from the encapsulated packet (320) to obtain a de-encapsulated packet (322) comprising the data packet with the data packet header may be carried out by removing the monitoring metadata header from the encapsulated packet (320). Removing the monitoring metadata header from the encapsulated packet (320) may be sufficient to result in the de-encapsulated packet (322). Alternatively, other changes to the encapsulated packet (322) may be necessary to result in the de-encapsulated packet. Such changes may include, for example, adding an indication that the de-encapsulated packet was previously encapsulated, removing trailer data, removing or changing length data, and removing or changing error correcting code.

The method of FIG. 3 further includes directing (306), by the analyzer virtual machine (126) based on the data packet header, the de-encapsulated packet (322) to a virtual network interface (208) associated with a packet capture application within the analyzer virtual machine (126). Directing (306), by the analyzer virtual machine (126) based on the data packet header, the de-encapsulated packet (322) to a virtual network interface (208) associated with a packet capture application within the analyzer virtual machine (126) may be carried out by applying a filter with a set of criteria to the incoming de-encapsulated packet (322). If the de-encapsulated packet (322) matches the set of criteria, the de-encapsulated packet (322) is sent to the virtual network interface (208) associated with the filter. If the de-encapsulated packet (322) does not match the set of criteria, another filter (associated with another virtual network interface) may be applied (if one exists). If no filters exist that include a set of criteria that match the de-encapsulated packet (322), then the packet is discarded. Once the packet is received by the virtual network interface (208), the packet is processed and provided to a packet capture application associated with the virtual network interface (208).

The above features improve the operation of the computer system by offloading data packet filtration from the packet capture application to lower level functions. Specifically, the incoming encapsulated packets are de-encapsulated and filtered prior to being directed to the virtual network interface and packet capture application. This reduces the workload for the packet capture application, leaving only monitoring and analyzing of the desired packets.

Figure 4:
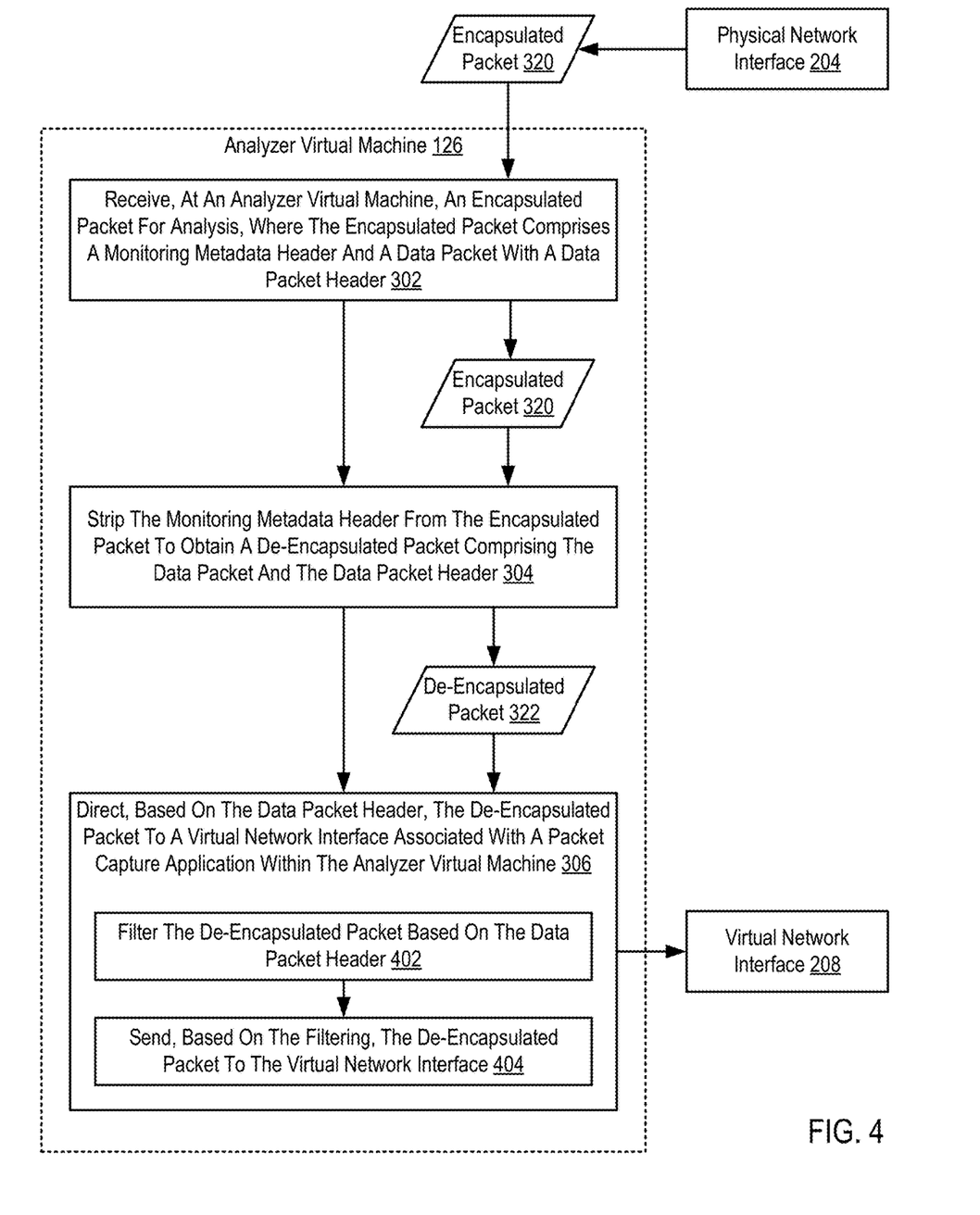
FIG. 4 sets forth a flow chart illustrating an exemplary method for capturing data packets for analysis using a virtual machine according to embodiments of the present invention.

For further explanation, FIG. 4 sets forth a flow chart illustrating a further exemplary method for capturing data packets for analysis using a virtual machine according to embodiments of the present invention that includes receiving (302), by an analyzer virtual machine (126), an encapsulated packet (320) for analysis, wherein the encapsulated packet (320) comprises a monitoring metadata header and a data packet with a data packet header; stripping (304), by the analyzer virtual machine (126), the monitoring metadata header from the encapsulated packet (320) to obtain a de-encapsulated packet (322) comprising the data packet with the data packet header; and directing (306), by the analyzer virtual machine (126) based on the data packet header, the de-encapsulated packet (322) to a virtual network interface (208) associated with a packet capture application within the analyzer virtual machine (126).

The method of FIG. 4 differs from the method of FIG. 3, however, in that directing (306), by the analyzer virtual machine (126) based on the data packet header, the de-encapsulated packet (322) to a virtual network interface (208) associated with a packet capture application within the analyzer virtual machine (126) includes filtering (402) the de-encapsulated packet (322) based on the data packet header; and sending (404), based on the filtering, the de-encapsulated packet (322) to the virtual network interface (208).

Filtering (402) the de-encapsulated packet (322) based on the data packet header may be carried out by applying a set of criteria from a filter to the de-encapsulated packet (322). A set of criteria may be applied for each filter configured in the stripping and filtering mechanism. De-encapsulated packets that do not match any set of criteria are discarded before reaching the virtual network interface (208). Sending (404), based on the filtering, the de-encapsulated packet (322) to the virtual network interface (208) may be carried out by identifying the virtual network interface (208) associated with the filter matching the incoming de-encapsulated packets and sending the de-encapsulated packets to the identified virtual network interface (208).

In view of the explanations set forth above, readers will recognize that the benefits of capturing data packets for analysis using a virtual machine according to embodiments of the present invention include:

- Improving the operation of a computing system by removing overhead tasks from the packet capture applications, increasing computing system efficiency and packet monitoring capability.
- Improving the operation of a computing system by shifting filtering and de-encapsulating tasks to lower level functions, increasing computing system efficiency and packet monitoring capability.
- Improving the operation of a computing system by separating virtual network interface functions on a per filtered packet stream basis, increasing computing system efficiency and packet monitoring capability.

Exemplary embodiments of the present invention are described largely in the context of a fully functional computer system for capturing data packets for analysis using a virtual machine. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
by program instructions on a computing device,
receiving, at an analyzer virtual machine, an encapsulated packet for analysis, wherein the encapsulated packet comprises a monitoring metadata header and a mirrored data packet with a data packet header, and wherein the analyzer virtual machine is one of a plurality of virtual machines hosted on the computing device;
stripping, by the analyzer virtual machine, the monitoring metadata header from the encapsulated packet to obtain a de-encapsulated packet comprising the data packet with the data packet header; and
directing, by the analyzer virtual machine and based on the data packet header, the de-encapsulated packet to a virtual network interface associated with a packet capture application within the analyzer virtual machine for analysis by the packet capture application.

2. The method of claim 1, wherein directing the de-encapsulated packet to the virtual network interface associated with the packet capture application within the analyzer virtual machine comprises:
filtering the de-encapsulated packet based on the data packet header; and
sending, based on the filtering, the de-encapsulated packet to the virtual network interface.

3. The method of claim 1, wherein the virtual network interface is one of a plurality of virtual network interfaces on the analyzer virtual machine, wherein the packet capture application operates within an application layer of the analyzer virtual machine, and wherein each of the plurality of virtual network interfaces operate at a kernel layer of the analyzer virtual machine.

4. The method of claim 3, wherein each of the plurality of virtual network interfaces is associated with a different packet capture application within the analyzer virtual machine.

5. The method of claim 1, wherein the de-encapsulated packet is directed to the virtual network interface based on a port identified in the data packet header.

6. The method of claim 1, wherein the monitoring metadata header is used by a host of the analyzer virtual machine to direct the encapsulated packet to the analyzer virtual machine.

7. The method of claim 1, wherein the analyzer virtual machine receives the encapsulated packet via a virtual network.

8. An apparatus comprising a computing device, a computer processor, and a computer memory operatively coupled to the computer processor, the computer memory having disposed within it computer program instructions that, when executed by the computer processor, cause the apparatus to carry out the steps of:
receiving, at an analyzer virtual machine, an encapsulated packet for analysis, wherein the encapsulated packet comprises a monitoring metadata header and a mirrored data packet with a data packet header, and wherein the analyzer virtual machine is one of a plurality of virtual machines hosted on the computing device;
stripping, by the analyzer virtual machine, the monitoring metadata header from the encapsulated packet to obtain a de-encapsulated packet comprising the data packet with the data packet header; and
directing, by the analyzer virtual machine and based on the data packet header, the de-encapsulated packet to a virtual network interface associated with a packet capture application within the analyzer virtual machine for analysis by the packet capture application.

9. The apparatus of claim 8, wherein directing the de-encapsulated packet to the virtual network interface associated with the packet capture application within the analyzer virtual machine comprises:
filtering the de-encapsulated packet based on the data packet header; and
sending, based on the filtering, the de-encapsulated packet to the virtual network interface.

10. The apparatus of claim 8, wherein the virtual network interface is one of a plurality of virtual network interfaces on the analyzer virtual machine, wherein the packet capture application operates within an application layer of the analyzer virtual machine, and wherein each of the plurality of virtual network interfaces operate at a kernel layer of the analyzer virtual machine.

11. The apparatus of claim 10, wherein each of the plurality of virtual network interfaces is associated with a different packet capture application within the analyzer virtual machine.

12. The apparatus of claim 8, wherein the de-encapsulated packet is directed to the virtual network interface based on a port identified in the data packet header.

13. The apparatus of claim 8, wherein the monitoring metadata header is used by a host of the analyzer virtual machine to direct the encapsulated packet to the analyzer virtual machine.

14. The apparatus of claim 8, wherein the analyzer virtual machine receives the encapsulated packet via a virtual network.

15. A computer program product including a non-volatile computer readable storage medium and computer program instructions stored therein that, when executed, cause a computer to carry out the steps of:

receiving, at an analyzer virtual machine, an encapsulated packet for analysis, wherein the encapsulated packet comprises a monitoring metadata header and a mirrored data packet with a data packet header, and wherein the analyzer virtual machine is one of a plurality of virtual machines hosted on a virtualization platform on a computing device;

stripping, by the analyzer virtual machine, the monitoring metadata header from the encapsulated packet to obtain a de-encapsulated packet comprising the data packet with the data packet header; and directing, by the analyzer virtual machine and based on the data packet header, the de-encapsulated packet to a virtual network interface associated with a packet capture application within the analyzer virtual machine for analysis by the packet capture application.

16. The computer program product of claim 15, wherein directing the de-encapsulated packet to the virtual network interface associated with the packet capture application within the analyzer virtual machine comprises:

filtering the de-encapsulated packet based on the data packet header; and sending, based on the filtering, the de-encapsulated packet to the virtual network interface.

17. The computer program product of claim 15, wherein the virtual network interface is one of a plurality of virtual network interfaces on the analyzer virtual machine, wherein the packet capture application operates within an application layer of the analyzer virtual machine.

18. The computer program product of claim 17, wherein each of the plurality of virtual network interfaces is associated with a different packet capture application within the analyzer virtual machine.

19. The computer program product of claim 15, wherein the de-encapsulated packet is directed to the virtual network interface based on a port identified in the data packet header.

20. The computer program product of claim 15, wherein the monitoring metadata header is used by a host of the analyzer virtual machine to direct the encapsulated packet to the analyzer virtual machine.

* * * * *